(12) United States Patent
Berge et al.

(10) Patent No.: US 10,586,465 B2
(45) Date of Patent: Mar. 10, 2020

(54) DETERMINATION OF A CHANGE IN ATMOSPHERIC PRESSURE BASED ON RADIO FREQUENCY RETURN SIGNAL

(71) Applicant: International Business Machines Corporation, Armonk, NY (US)

(72) Inventors: Layne A. Berge, Rochester, MN (US); John R. Dangler, Rochester, MN (US); Matthew S. Doyle, Chatfield, MN (US); Thomas W. Liang, Rochester, MN (US); Manuel Orozco, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 15/378,325

(22) Filed: Dec. 14, 2016

(65) Prior Publication Data

US 2018/0164425 A1 Jun. 14, 2018

(51) Int. Cl.
| | | |
|---|---|---|
| *G08G 5/00* | (2006.01) | |
| *G01S 13/91* | (2006.01) | |
| *G01S 13/92* | (2006.01) | |
| *G01S 13/87* | (2006.01) | |
| *G01S 13/50* | (2006.01) | |
| *G01S 7/41* | (2006.01) | |
| *G01S 13/95* | (2006.01) | |
| *G01S 13/78* | (2006.01) | |

(52) U.S. Cl.
CPC ............ *G08G 5/0091* (2013.01); *G01S 7/415* (2013.01); *G01S 13/50* (2013.01); *G01S 13/87* (2013.01); *G01S 13/91* (2013.01); *G01S 13/92* (2013.01); *G01S 13/781* (2013.01); *G01S 13/951* (2013.01); *Y02A 90/18* (2018.01)

(58) Field of Classification Search
CPC combination set(s) only.
See application file for complete search history.

(56) References Cited

U.S. PATENT DOCUMENTS

| | | | | |
|---|---|---|---|---|
| 4,403,220 A | * | 9/1983 | Donovan | ............ G01S 13/9303 342/29 |
| 5,301,905 A | | 4/1994 | Blaha | |
| 6,563,452 B1 | * | 5/2003 | Zheng | ..................... G01S 7/003 342/26 R |
| 6,590,520 B1 | * | 7/2003 | Steele | ................... G01S 13/953 342/26 R |
| 6,637,266 B1 | | 10/2003 | Froom | |

(Continued)

FOREIGN PATENT DOCUMENTS

WO 2014174340 A1 10/2014

OTHER PUBLICATIONS

Disclosed Anonomously, "Fast Secure Limited Application Access"; An IP.com Prior Art Database Technical Disclosure; http://ip.com/IPCOM/000209822; Aug. 17, 2011.

(Continued)

*Primary Examiner* — Mamadou L Diallo
(74) *Attorney, Agent, or Firm* — Patterson + Sheridan, LLP

(57) ABSTRACT

Apparatus and methods to determine a change in atmospheric pressure between a forward portion of a flying object and a rear portion of the flying object based on at least one radio frequency (RF) return signal, and to determine a password using the determined change in atmospheric pressure.

20 Claims, 4 Drawing Sheets

(56) References Cited

U.S. PATENT DOCUMENTS

| | | | | |
|---|---|---|---|---|
| 6,854,687 | B1* | 2/2005 | Morgenstern | B64C 1/0009 244/1 N |
| 8,072,702 | B2* | 12/2011 | Suzuki | G01L 11/04 360/75 |
| 9,031,734 | B2 | 5/2015 | Froom | |
| 2005/0028595 | A1* | 2/2005 | Pfeifer | B60C 23/0408 73/715 |
| 2013/0173926 | A1 | 7/2013 | Morese et al. | |
| 2014/0177090 | A1* | 6/2014 | Contreras | G11B 5/6029 360/75 |
| 2016/0137311 | A1* | 5/2016 | Peverill | B64C 39/024 244/110 C |
| 2017/0301251 | A1* | 10/2017 | Robin | B64D 45/00 |
| 2017/0351900 | A1* | 12/2017 | Lee | H04N 5/2257 |
| 2018/0061249 | A1* | 3/2018 | Cui | G08G 5/0043 |
| 2018/0180413 | A1* | 6/2018 | Singh | G01C 9/00 |
| 2018/0266395 | A1* | 9/2018 | Abramov | G06F 17/5009 |
| 2018/0313651 | A1* | 11/2018 | Laine | G06K 9/6202 |
| 2018/0327113 | A1* | 11/2018 | von Flotow | B64F 1/02 |

OTHER PUBLICATIONS

Miller, T.; "Universal Flight Data Recorder for General Aviation Aircraft"; An IP.com Prior Art Database Technical Disclosure; http://ip.com/IPCOM/000226389; Apr. 2, 2013.

"Thermodynamics the Relation Between Temperature Change and Heat", 8 pages, [Online] http://web.mit.edu/16.unified/www/FALL/thermodynamics/notes/node18.html [Accessed Jan. 11, 2016].

Rich Smith (TMFDitty), "Did China Just Render America's $1 Trillion Stealth Fighter Program Obsolete?", Oct. 19, 2014. [Online], Available: http://www.fool.com/investing/general/2014/10/19/did-cna-just-render-americas-1-trillion-stealth.aspx?source=isesitlnk0000001&mrr=1.00 [Accessed Jan. 11, 2016].

Federal Aviation Administration, "Digital AIr Surveillance Radar (DASR) ASR-11", 1 page, [Online] . Available: http://www.radartutorial.eu/19.kartei/karte208.en.html—[Accessed Jan. 11, 2016].

David M. Pozar, "Microwave Engineering, 3rd Edition", Wley India Pvt. Limited, 2009. [E-book] Available: Google Books.

Bryan Lufkin, "Detection Systems Listen for Drones Flying Under the Radar", May 18, 2015. [Online], Available: http://gizmodo.com/detection-systems-listen-for-drones-flying-under-the-ra-1704764102 [Accessed Jan. 11, 2016].

J. Callis, T. Daniel, and J. Wettlaufer, "Insect Flight Research", [Online], 5 pages, Available: http://faculty.washington.edu/callis/Flight/Insect_Flight_A-99.htm [Accessed on Jan. 11, 2016].

R. Nave, "Specific Heats of Gases", 6 pages [Online]. Available: http://www.engineeringtoolbox.com/specific-heat-ratio-d_608.html [Accessed on Jan. 11, 2016].

Wikipedia, "Heat capacity", 26 pages, [Online], Available: https://en.wikipedia.org/wiki/Heat_capacity [Accessed Jan. 11, 2016].

Western Washington University, "Heat Capacities of an Ideal Gas", [Online] 2 pages, Available: http://faculty.wwu.edu/vawter/physicsnet/Topics/Thermal/HeatCapIdealGas.html [Accessed on Jan. 12, 2016].

Tom Harris, "How Car Alarms Work", [Online] 16 pages, Available: http://auto.howstuffworks.com/car-alarm.htm [Accessed Jan. 11, 2016].

Emily Finn, MIT News Office, "Seeing through walls", Oct. 18, 2011, [Online] 3 pages, Available: http://news.mit.edu/2011/ll-seeing-through-walls-1018 [Accessed Jan. 11, 2016].

Glen E. Thorncroft, "What is specific heat at constant volume, cv?", [Online] 3 pages, Available: http://www.calpoly.edu/~gthomcr/ME302/documents/csubv.pdf [Accessed Jan. 11, 2016].

Annick Chaplain, Aveillant News, "Confirmation: commercially viable drone-tracking capability", May 5, 2015, [Online] 5 pages, Available: http://www.aveillant.com/news/holographic-radar-drone-tracking-capability/ [Accessed Jan. 11, 2016].

Annick Chaplain, Aveillant News, "Aveillant Attending 2015 IEEE International Radar Conference", May 11, 2015, [Online] 2 pages, Available: http://www.aveillant.com/news/2015-ieee-international-radar-conference [Accessed Jan. 11, 2016].

Yunnus A. Cengel and Michael A. Boles, "Thermodynamics: An Engineering Approach, 5th edition", 2002, 3 pages, [Accessed Jan. 11, 2016].

"Specific Heats of Gases", 5 pages [Online]. Available:http://www.engineeringtoolbox.com/specific-heat-ratio-d_608.html [Accessed on Jan. 11, 2016].

\* cited by examiner

US 10,586,465 B2

DETERMINATION OF A CHANGE IN ATMOSPHERIC PRESSURE BASED ON RADIO FREQUENCY RETURN SIGNAL

I. FIELD OF THE DISCLOSURE

The present disclosure relates generally to radio frequency (RF) signal technologies, and in particular, to detecting and processing RF signals.

II. BACKGROUND

Existing radar techniques are based on detecting electromagnetic energy reflected off an object's conductive surface. Once detected by radar, a flying object entering a controlled airspace is required to have authorization for entry into the controlled airspace. For instance, an airplane requires authorization from an airport controller to land on an airport runway. As an example, transponder identifications (IDs) are used to identify the airplane.

III. SUMMARY OF THE DISCLOSURE

According to a particular embodiment, an apparatus includes a memory and a processor configured to determine a change in atmospheric pressure between a forward portion of a flying object and a rear portion of the flying object based on at least one radio frequency (RF) return signal. Put another way, the change may be indicative of a volume of air surrounding front and rear portions of a flying object based on an RF return signal. The RF return signal corresponds to the RF return signal reflected from the volume of air surrounding the front and the rear of the flying object. The apparatus may also include a receiver configured to receive the RF return signal. The apparatus may also include a transmitter configured to transmit RF signal. The memory may store at least one of: data corresponding to the change in the atmospheric pressure of the volume of air surrounding the front and the rear of the flying object, an authorization code to enter airspace, or data corresponding to at least one of a magnitude or a phase of the RF return signal.

In another embodiment, a method includes determining a change in atmospheric pressure of volume of air surrounding front and rear of a flying object based on RF return signal, where the RF return signal corresponds to the RF return signal reflected from the volume of air surrounding the front and the rear of the flying object. The method may also include determining encoded password based on data corresponding to at least one of a magnitude or a phase of the RF return signal. The method may further include comparing the encoded password with an authorization code. The method may also include sending a signal upon a determination that the encoded password does not match the authorization code.

In another embodiment, a computer program product for decoding pressure differential password, the computer program product includes a computer readable storage medium having program instructions executable by a device to cause the device to determine a change in atmospheric pressure of volume of air surrounding front and rear of a flying object based on RF return signal, where the RF return signal corresponds to the RF return signal reflected from the volume of air surrounding the front and the rear of the flying object.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

Figure 1:
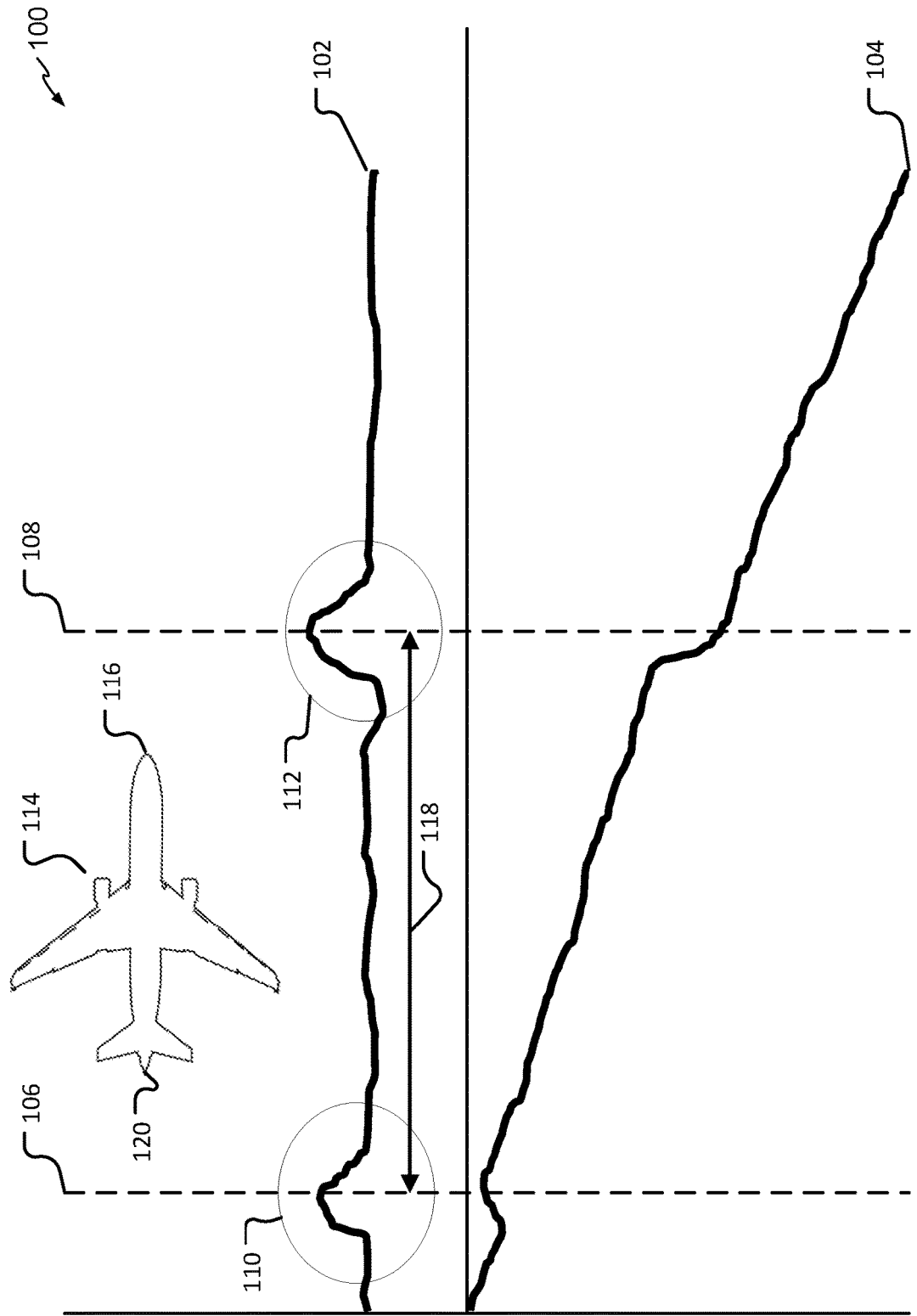
FIG. 1 is a diagram illustrating an exemplary embodiment of a magnitude and a phase of an RF return signal that corresponds to atmospheric pressure of volume of air surrounding front and rear of a flying object, e.g., airplane.

An illustrative method determines aircraft identification, in part, using a password. The password may be detected by the speed of the aircraft and pressure differentials detected leading and following the aircraft. By changing the speed of the aircraft as it flies over detection sites, a unique password may be detected. The password may be created and read by detecting the pressure differentials leading and following the aircraft.

An embodiment capitalizes on a phenomenon that an aircraft has areas of high pressure leading it and areas of low pressure tailing it during flight. These pressure differentials are detectable because the compressed/decompressed air, with respect to the unperturbed air surrounding the aircraft, have different values of permittivity. When an incident electromagnetic wave propagates through these regions, a small amount of energy is reflected. The amount reflected back may be similar in magnitude for high and low pressure areas, however, they may have opposite effects on phase. The combination of timing these reflections, as well as looking at magnitude and phase, may allow detection sites in a secured area to know the speed of the aircraft as it is flying.

The pressure differentials are detectable because the compressed or decompressed air, with respect to the unperturbed air surrounding the aircraft, has different values of permittivity. When an incident electromagnetic wave propagates through these regions, a small amount of energy may be reflected. The amount of energy reflected back may be similar in magnitude for high and low pressure areas, however, they may have opposite effects on phase. The combination of timing gleaned from reflection, as well as determinations and measurements of magnitude and phase may allow the detection sites in a secured area to know the speed of the flying aircraft.

Differing atmospheric pressures are created as a flying object travels through atmosphere. As the flying object moves forward, air waves gather together and compress a volume of air surrounding a front of the flying object. The compressed air causes a higher atmospheric pressure to the volume of air surrounding the front of the flying object. As the flying object moves past a particular point in airspace, the air decompresses, causing a lower atmospheric pressure around the volume of air surrounding the rear of the flying object. A change in the atmospheric pressure of the volume of air surrounding the front and the rear of the flying object causes a change in permittivity at a boundary between the flying object and the volume of air that is immediately in the front and in the rear of the flying object. The change in permittivity causes regions of compressed air and uncompressed air to have different dielectric coefficients that are detectable by radar returns.

The radar returns are RF signals that are reflected from the volume of air surrounding the front of the airplane. The radar returns may also include the RF signals reflected from the volume of air surrounding the rear of the airplane. The RF signals reflected from the volume of air surrounding the front and the rear of the airplane are distinct from any other reflected RF signals, e.g., RF signals reflected from the airplane.

Further, the change in permittivity of the volume of air in the front and in the rear of the flying object is dependent on velocity of the flying object and medium within which the flying object is passing. To illustrate, an equation for enthalpy difference for ideal gases with constant specific heats is:

$$C_p(T_o - T) = \frac{\bar{V}^2}{2} \quad \text{(Equation 1)}$$

where T=temperature of steady state gas; $T_0$=temperature of compressed gas, V=velocity of object, and Cp=medium constant of specific heat.

Additionally, for isentropic process, stagnation pressure can be determined from:

$$\frac{T_o}{T} = \left(\frac{P_o}{P}\right)^{(k-1)/k} \quad \text{(Equation 2)}$$

where $P_0$=pressure of compressed gas, P=pressure of steady state gas, and k=specific heat capacity ratio Cp/Cv, where Cv=constant volume process heat capacity. Thus:

$$\left. \begin{array}{l} C_p(T_0 - T) = \dfrac{\bar{V}^2}{2} \\ \dfrac{T_0}{T} = \left(\dfrac{P_0}{P}\right)^{\frac{k-1}{k}} \end{array} \right\} \quad \begin{array}{l} P_0 = P\left(\dfrac{\bar{V}^2}{2C_pT} + 1\right)^{\frac{k}{k-1}} \\ \bar{V}^2 = |V|*|V| \end{array} \quad \text{(Equation 3)}$$

where $P_0$, $T_0$, Cp, and k are constants. The above equation 3 illustrates that a change in atmospheric pressure of the volume of air in front and at the rear of a flying object is dependent on a velocity of the flying object and a medium through which the flying object is passing.

The change in the atmospheric pressure of the volume of air causes a change in a permittivity of the volume of air. To illustrate, a magnitude of a reflected wave, e.g., a reflected RF signal, is proportional to a magnitude of a transmitted wave, e.g., an RF signal, by a reflection coefficient, gamma (Γ). The reflection coefficient is related to permittivity of a medium by the inverse square root of permittivity, $$\Gamma = \frac{n - n_0}{n + n_0} \quad \text{(Equation 4)}$$

where n equals for a lossless case:

$$n = n_0 \sqrt{\frac{\mu_r}{\epsilon_r}} \quad \text{(Equation 5)}$$

As a non-limiting illustrative example, an airplane travelling at 250 meters per second (m/s) (559 miles per hour (mph)) at an altitude of 5000 meters (m) (16,404 feet (ft)), the pressure P of wave-front is 80.77 kilopascal (kPa) (11.71 pound-force per square inch (psi)), where T=255.7 Kelvin (K) (−17.45 Celsius (° C.)), P=54.05 kPa (7.84 psi), and converting $V^2$ ($m^2/s^2$) to kilojoules per kilograms (kJ/kg) by the ratio 1 kJ/kg=1000 $m^2/s^2$). This gives a change of 26.7 kPa (3.87 psi). Based on permittivity change of gases under a compression chart, shown below, the resulting permittivity difference is 0.014%.

| Methane | | Nitrogen | | Carbon Dioxide | | Argon | | Oxygen | |
|---|---|---|---|---|---|---|---|---|---|
| p (kPa) | 100(ε − 1) | p (kPa) | 100(ε − 1) | p (kPa) | 100(ε − 1) | p (kPa) | 100(ε − 1) | p (kPa) | 100(ε − 1) |
| 0.00 | −0.00001 | 0.00 | 0.00000 | 0.00 | 0.00001 | 0.00 | 0.00000 | 0.00 | 0.00000 |
| 1008.18 | 0.80294 | 1008.76 | 0.52978 | 712.77 | 0.64989 | 750.79 | 0.37302 | 1014.93 | 0.48296 |
| 2273.85 | 1.85653 | 2272.76 | 1.19787 | 1609.72 | 1.55081 | 1744.80 | 0.87330 | 2257.79 | 1.08408 |
| 3266.37 | 2.71938 | 3255.85 | 1.71997 | 2310.86 | 2.33570 | 2521.28 | 1.26895 | 3257.64 | 1.57504 |
| 4274.46 | 3.63133 | 4015.49 | 2.12435 | 3023.01 | 3.22616 | 3317.53 | 1.67899 | 4237.88 | 2.06251 |
| 5241.38 | 4.53406 | 5026.19 | 2.66316 | 3730.75 | 4.23348 | 4102.37 | 2.08716 | 5246.21 | 2.56971 |
| 6252.83 | 5.51324 | 6244.33 | 3.31237 | 4455.90 | 5.44205 | 4895.75 | 2.50362 | 6238.43 | 3.07411 |
| 6997.49 | 6.25492 | 6988.17 | 3.70847 | 4987.24 | 6.49073 | 5488.95 | 2.81735 | 7000.90 | 3.46498 |
| 5902.55 | 5.17028 | 5941.75 | 3.15133 | 4355.55 | 5.26150 | 4831.79 | 2.46992 | 6145.83 | 3.02687 |
| 5140.08 | 4.43771 | 5139.12 | 2.72342 | 3668.26 | 4.13857 | 4116.14 | 2.09441 | 5073.92 | 2.48267 |
| 1075.12 | 0.85743 | 4987.80 | 2.64260 | 2974.04 | 3.16162 | 3324.41 | 1.68265 | 4256.00 | 2.07157 |
| 3243.04 | 2.69876 | 1974.13 | 1.03974 | 2239.80 | 2.25274 | 2506.50 | 1.26146 | 3260.61 | 1.57658 |
| 2257.01 | 1.84215 | 3251.56 | 1.71772 | 1596.95 | 1.53765 | 1741.95 | 0.87195 | 2262.78 | 1.08656 |
| 1257.78 | 1.00661 | 3999.70 | 2.11593 | 887.36 | 0.81765 | 947.82 | 0.47169 | 1257.54 | 0.59945 |
| 0.00 | 0.00001 | 3244.67 | 1.71409 | 0.00 | −0.00001 | 0.00 | 0.00000 | 0.00 | 0.00000 |
| | | 2269.70 | 1.19627 | | | | | | |

Using the above equations 1 through 5, a reflected RF signal magnitude of 0.007% is calculated. The calculated magnitude of 0.007% is the energy of RF return signal detected by an RF receiver.

In addition to the velocity of the flying object and the medium through which the flying object is passing, the change in permittivity of the volume of air surrounding the front and the rear of the flying object may also depend on at least one of various flying maneuvers of the flying object or positional changes in mechanical parts of the flying object as it flies. Further, an optimum speed of the flying object for determining a change in atmospheric pressure of the volume of air in the front and the rear of the flying object may be configured between 44.70 m/s (100 mph) to 134.11 m/s (300 mph).

FIG. 1 shows an exemplary embodiment of a magnitude 102 and a phase 104 of an RF return signal that corresponds to atmospheric pressure of a volume of air 106, 108 surrounding a front 116 and a rear 120 of an airplane 114. The magnitude 102 of the RF return signal for the atmospheric pressure of the volume of air 108 surrounding the front 116 of the airplane 114 corresponds to RF return signal 112. The magnitude 102 of the RF return signal for the atmospheric pressure of the volume of air 106 surrounding the rear 120 of the airplane 114 corresponds to RF return signal 110. A distance 118 between the RF return signal 110 and the RF return signal 112 is associated with a speed of the airplane 114 as it passes a detection site. A determination of a change in the atmospheric pressure of the volume of air 106, 108 may be based on the magnitude 102, the phase 104, or a combination. The determination of the change in the atmospheric pressure of the volume of air 106, 108 may enable decoding of a pressure differential password.

Figure 2:
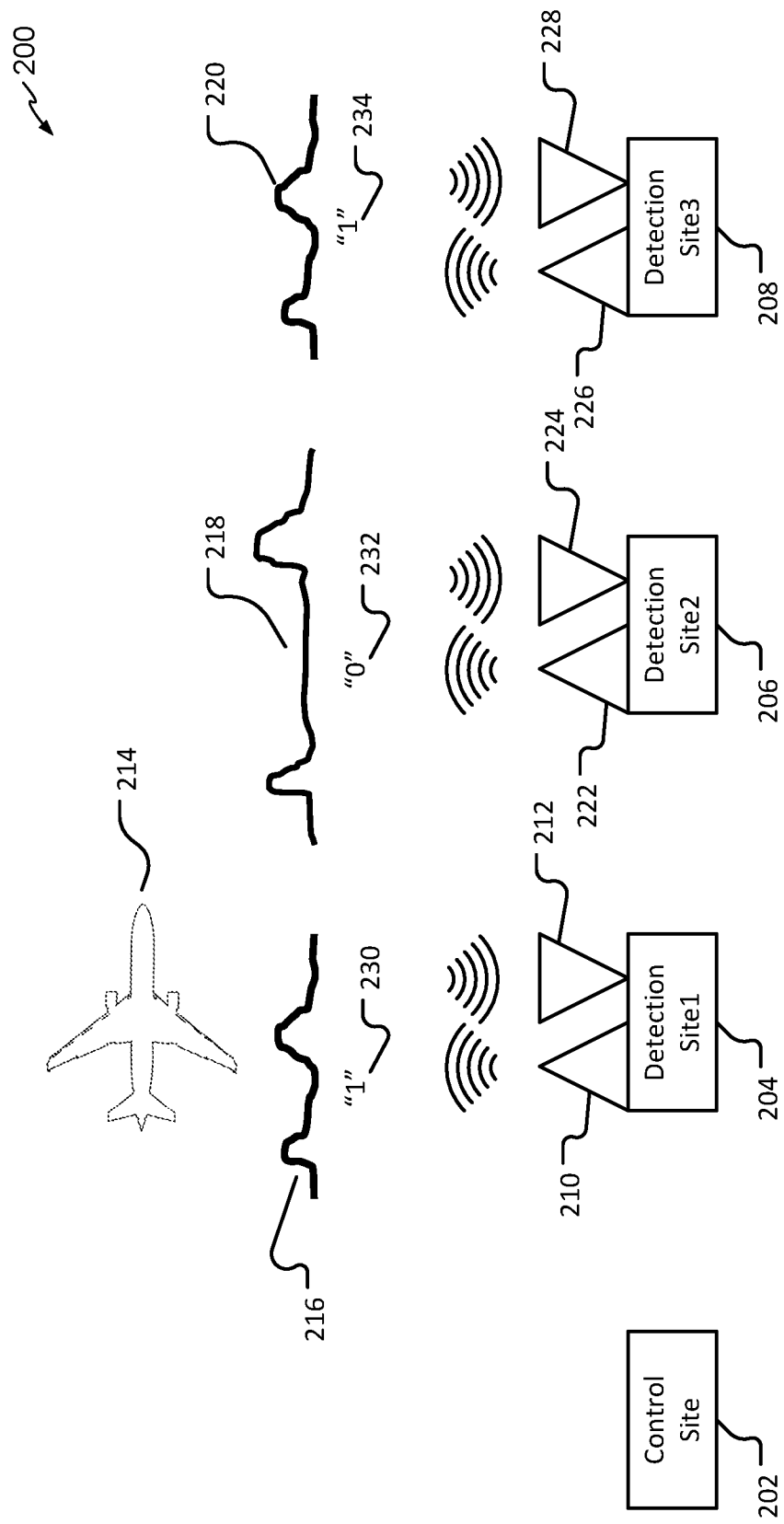
FIG. 2 is a diagram illustrating an exemplary embodiment of a pressure differential password based on a magnitude of an RF return signal.

FIG. 2 depicts a diagram illustrating an exemplary system 200 that includes a pressure differential password that may be determined based on a magnitude of an RF return signal. As an airplane 214 flies over a detection site 204, 206, 208, the detection site 204, 206, 208 detects an RF return signal 216, 218, 220 that corresponds to atmospheric pressure of volume of air surrounding front and rear of the airplane 214. The detection site 204, 206, 208 includes a receiver 212, 224, 228 configured to receive the RF return signal 216, 218, 220. The detection site 204, 206, 208 may also include a transmitter 210, 222, 226 configured to transmit an RF transmit signal. At least one of the detection sites 204, 206, 208 may be used to detect the RF return signal 216, 218, 220.

At least one of the detection sites 204, 206, 208 may determine a change in atmospheric pressure of in volume of air surrounding the front and the rear of the airplane 214. The change may be determined based on the RF return signal 216, 218, 220 corresponding to the RF return signal reflected from the volume of air surrounding the front and the rear of the airplane 214. The RF return signal reflected from the volume of air surrounding the front of the airplane 214 may correspond to the RF return signal 112 of FIG. 1. The RF return signal reflected from the volume of the air surrounding the rear of the airplane 214 may correspond to the RF return signal 110 of FIG. 1.

Alternatively, a control site 202 may determine the change in the atmospheric pressure of the volume of air surrounding the front and the rear of the airplane 214 based on the RF return signal 216, 218, 220 corresponding to the RF return signal received from the detection site 204, 206, 208. In another embodiment, the control site 202 may collect each of the determined change in the atmospheric pressure from the detection sites 204, 206, 208.

At least one of the control site 202 or at least one of the detection sites 204, 206, 208 may determine an encoded password based on data corresponding to at least one of a magnitude or a phase of an RF return signal. The RF return signal may correspond to the RF return signal 216, 218, 220. The RF return signal 216 may correspond to the RF return signal received by the receiver 212 of the detection site1 204. The RF return signal 218 may correspond to the RF return signal received by the receiver 224 of the detection site 206. The RF return signal 220 may correspond to the RF return signal received by the receiver 228 of the detection site3 208.

The RF return signal 216 may correspond to a first portion 230 of the pressure differential password, where the first portion 230 may correspond to a value of "1", which may correspond to a relatively fast airspeed. The RF return signal 218 may correspond to a second portion 232 of the pressure differential password, where the second portion 232 may correspond to a value of "0", which may correspond to a relatively slow(er) speed. The RF return signal 220 may correspond to a third portion 234 of the pressure differential password, where the third portion 234 may correspond to the value of "1". The RF return signal may correspond to a plurality of portions of the pressure differential password having a plurality of values. Each RF return signal 216, 218, 220 and the corresponding portion 230, 232, 234 of the pressure differential password may be associated with a particular speed of the airplane 214 as it passes a particular detection site. For example, each RF return signal 216, 218, 220 may correspond to the magnitude 102 of FIG. 1 having the RF return signal 110, the RF return signal 112, and the distance 118 of FIG. 1.

Various communication topologies may be used by the detection sites 204, 206, 208 to communicate with each other or with the control site 202. For example, the detection site 204 may be directly connected to the detection site 206. In another example, the detection site 204 may be indirectly connected to the detection site 206 and the detection site 208 via a communication network. In another example, the detection sites 204, 206, 208 may be connected to the control site 202 via the communication network.

Figure 3:
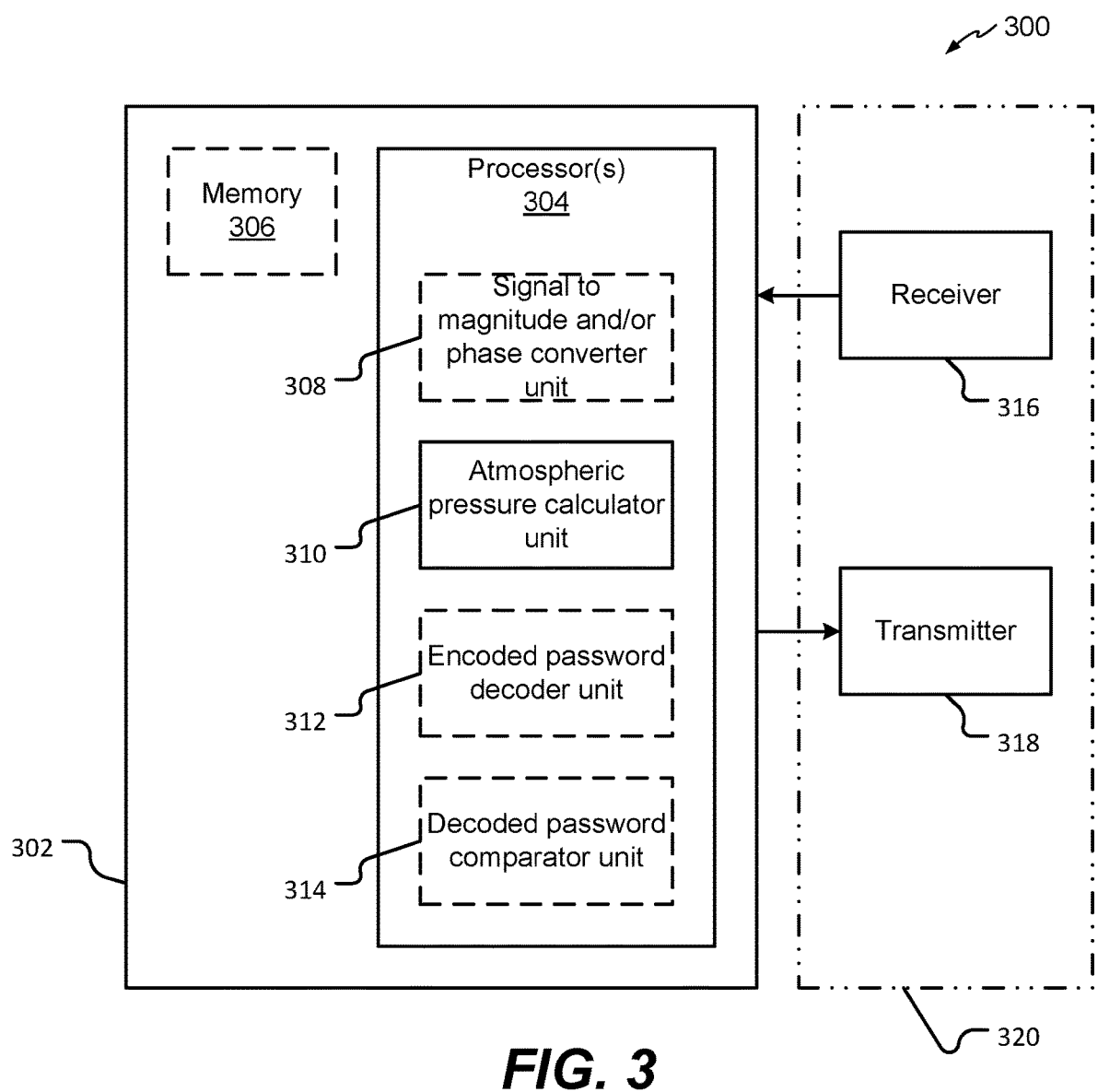
FIG. 3 is a block diagram of a system that determines a change in atmospheric pressure of volume of air surrounding front and rear of a flying object.

FIG. 3 shows a block diagram of a system 300 that determines a change in atmospheric pressure of a volume(s) of air surrounding front and rear of a flying object. The flying object may correspond to the airplane 114 of FIG. 1 or the airplane 214 of FIG. 2. The atmospheric pressure of the volume of air surrounding the front and the rear of the flying object may correspond to the atmospheric pressure of the volume of air 106, 108 surrounding the front 116 and the rear 120 of the airplane 114 of FIG. 1. The device 302 may include a processor 304. The processor 304 may include an atmospheric pressure calculator unit 310 that is configured to determine a change in atmospheric pressure of volume of air surrounding front and rear of the flying object based on an RF return signal, where the RF return signal corresponds to the RF return signal reflected from the volume of air surrounding the front and the rear of the flying object. The RF return signal may correspond to the magnitude 102 having the RF return signal 110 and the RF return signal 112 of FIG. 1. The RF return signal may also correspond to the RF return signal 216 of FIG. 2, the RF return signal 218 of FIG. 2, the RF return signal 220 of FIG. 2, or any combination thereof.

The processor 304 may also include at least one of a signal to magnitude and/or phase converter unit 308, an encoded password decoder unit 312, or a decoded password comparator unit 314. In another embodiment, the least one of the signal to magnitude and/or phase converter unit 308, the encoded password decoder unit 312, or the decoded password comparator unit 314 may be included in another processor of the device 302, where the another processor is distinct from the processor 304.

The signal to magnitude and/or phase converter unit 308 may be configured to determine data corresponding to at least one of a magnitude or a phase of the RF return signal. The encoded password decoder unit 312 may be configured to determine an encoded password based on the data corresponding to the at least one of the magnitude or the phase of the RF return signal. The encoded password may correspond to a pressure differential password. The decoded password comparator unit 314 may be configured to compare the encoded password with an authorization code. The authorization code may be an authorization code to enter a particular airspace. The processor 304 may be configured to send a signal upon a determination that the encoded password does not match the authorization code. The signal may be associated with an alert or warning signal to a user, a discreet signal to a controller configured to receive the signal, where the controller may be associated with a tower control, an intrusion system, or any combination thereof.

The device 302 may also include a memory 306. The memory 306 may be configured to store at least one of: data corresponding to a change in atmospheric pressure of volume of air surrounding front and rear of the flying object, an authorization code to enter a particular airspace, and data corresponding to at least one of a magnitude or a phase of an RF return signal.

In another embodiment, the device 302 may also include a receiver 316. The receiver 316 may correspond to the receiver 212, 224, 228 of FIG. 2. The receiver 316 may be configured to receive the RF return signal 216, 218, 220 of FIG. 2. The device 302 may further include a transmitter 318. The transmitter 318 may correspond to the transmitter 210, 222, 226 of FIG. 2. The transmitter 318 may be configured to transmit an RF signal. In another embodiment, the receiver 316 and the transmitter 318 may be included in a transceiver 320. The transceiver 320 may be included in the device 302. Alternatively, the transceiver 320 may be distinct from the device 302. In another embodiment, the receiver 316 and the transmitter 318 are distinct from the device 302.

At least one of the detection site 204, 206, 208 of FIG. 2 may include the device 302. In another embodiment, the control site 202 of FIG. 2 may include the device 302. In another embodiment, at least one of the control site 202 of FIG. 2 or at least one of the detection site 204, 206, 208 of FIG. 2 may include the device 302, where the device 302 may include the processor 304 having any combination of the signal to magnitude and/or phase converter unit 308, the encoded password decoder unit 312, or the decoded password comparator unit 314.

Figure 4:
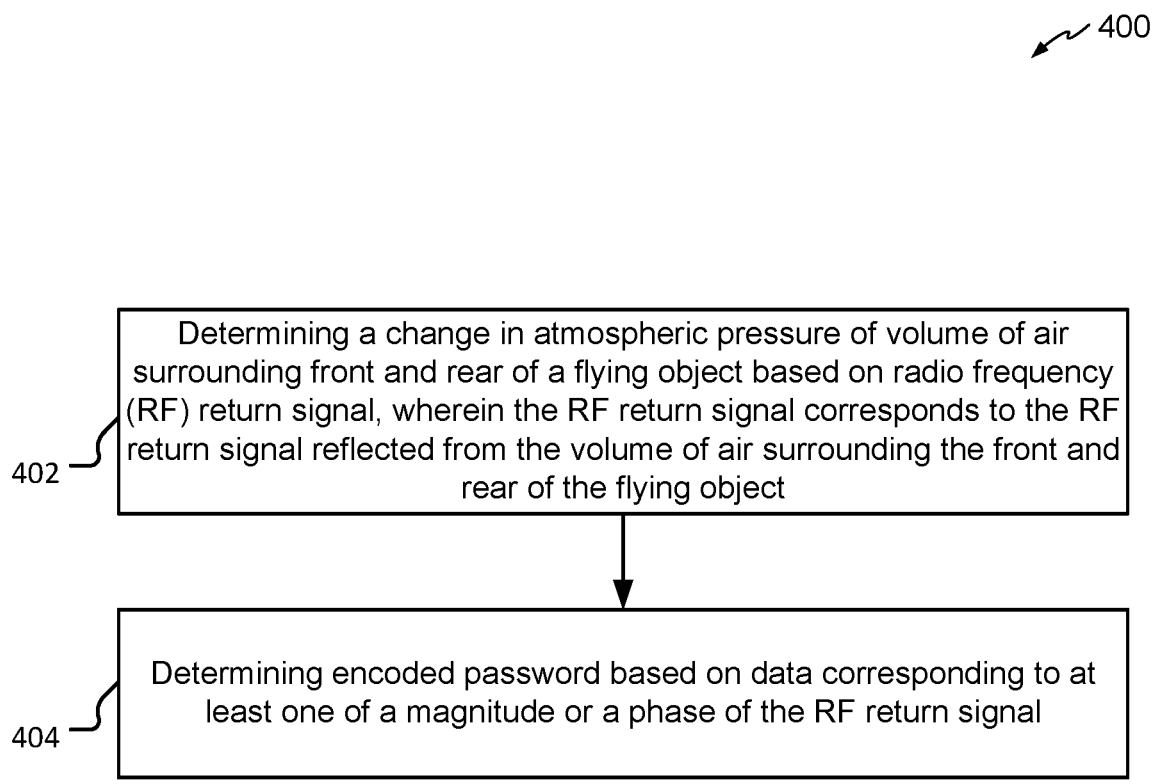
FIG. 4 is a flowchart of an illustrative non-limiting implementation of a method for determining a change in atmospheric pressure of volume of air surrounding front and rear of a flying object based on RF return signal.

FIG. 4 depicts a flowchart of an illustrative non-limiting implementation of a method for determining a change in atmospheric pressure of volume of air surrounding front and rear of a flying object based on RF return signal, where the RF return signal corresponds to the RF return signal reflected from the volume of air surrounding the front and the rear of the flying object. The method 400 may be implemented in the device 302 of FIG. 3. In a particular embodiment, the method 400 may be implemented in the processor 304 of FIG. 3.

The method 400 includes determining a change in atmospheric pressure of volume of air surrounding front and rear of a flying object based on RF return signal, where the RF return signal corresponds to the RF return signal reflected from the volume of air surrounding the front and the rear of the flying object, at 402. The method 400, at 402, may be implemented in the atmospheric pressure calculator unit 310 of FIG. 3. The atmospheric pressure of the volume of air surrounding the front and the rear of the flying object may correspond to the atmospheric pressure of the volume of air 106, 108 surrounding the front 116 and the rear 120 of FIG. 1. The RF return signal may correspond to the magnitude 102 having the RF return signal 110, the RF return signal 112, and the distance 118 of FIG. 1. The RF return signal may also correspond to the RF return signal 216 of FIG. 2, the RF return signal 218 of FIG. 2, the RF return signal 220 of FIG. 2, or any combination thereof. In an embodiment, the method 400 may be implemented in at least one of the control sites 202 in FIG. 2 or at least one of the detection sites 204, 206, 208 of FIG. 2.

In another embodiment, the method 400 may include determining encoded password based on data corresponding to at least one of a magnitude or a phase of the RF return signal, at 404. The encoded password may correspond to a pressure differential password. The method 400, at 404, may be implemented in the encoded password decoder unit 312 of FIG. 3. In a particular embodiment, the method 400, at 404, may be implemented in the processor 304 of FIG. 3. Alternatively, the method 400, at 404, may be implemented in another processor distinct from the processor 304 of FIG. 3.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. For example, an embodiment may include multiple processors connected to a single memory controller, either using separate processor busses from each processor to the memory controller, or using a single shared system bus that is connected to all processors and the memory controller. Thus, the present disclosure is not intended to be limited to the embodiments shown herein but is to be accorded the widest scope possible consistent with the principles and features as defined by the following claims.

The invention claimed is:

1. An apparatus comprising:
   a memory configured to store a plurality of atmospheric pressure readings; and
   a processor in communication with the memory, the processor configured to:
      determine a change in atmospheric pressure between a forward portion of a flying object and a rear portion of the flying object based on at least one radio frequency (RF) return signal; and
      decode a pressure differential password, based on the determined change.

2. The apparatus of claim 1, wherein the processor is further configured to determine data corresponding to at least one of a magnitude and a phase of the RF return signal.

3. The apparatus of claim 1, wherein the processor is configured to determine the change in atmospheric pressure based on data corresponding to at least one of a magnitude or a phase of the RF return signal.

4. The apparatus of claim 1, wherein the processor is further configured to compare the pressure differential password with an authorization code.

5. The apparatus of claim 4, wherein the processor is further configured to send a signal upon a determination that the pressure differential password does not match the authorization code.

6. The apparatus of claim 1, further comprising a receiver configured to receive the RF return signal.

7. The apparatus of claim 6, further comprising a transmitter configured to transmit a transmit RF signal.

8. The apparatus of claim 1, wherein the memory is further configured to store at least one of:
   data corresponding to the change in the atmospheric pressure of the volume of air surrounding the front and the rear of the flying object,
   an authorization code to enter airspace, and
   data corresponding to at least one of a magnitude or a phase of the RF return signal.

9. A method of decoding a pressure differential password, the method comprising:
   transmitting a transmit radio frequency (RF) signal;
   determining a change in atmospheric pressure between a forward portion of a flying object and a rear portion of the flying object based on at least one RF return signal; and
   using the determined change to decode a pressure differential password.

10. The method of claim 9, further comprising determining data corresponding to at least one of a magnitude or a phase of the RF return signal.

11. The method of claim 9, further comprising determining the change in atmospheric pressure based on data corresponding to at least one of a magnitude or a phase of the RF return signal.

12. The method of claim 11, further comprising comparing the pressure differential password with an authorization code.

13. The method of claim 12, further comprising sending a signal upon a determination that the pressure differential password does not match the authorization code.

14. The method of claim 9, further comprising receiving the RF return signal.

15. The method of claim 9, further comprising storing data corresponding to the change in the atmospheric pressure of the volume of air surrounding the front and the rear of the flying object.

16. The method of claim 9, further comprising storing at least one of:
   an authorization code to enter airspace, and
   data corresponding to at least one of a magnitude or a phase of the RF return signal.

17. A computer program product for decoding a pressure differential password, the computer program product comprising a non-transitory computer readable storage medium having program instructions embodied therewith, the program instructions executable by a device to cause the device to determine a change in atmospheric pressure of volume of air surrounding front and rear of a flying object based on radio frequency (RF) return signal, wherein the RF return signal corresponds to the RF return signal reflected from the volume of air surrounding the front and the rear of the flying object, and to use the determined change to decode the pressure differential password.

18. The computer program product of claim 17, wherein the program instructions executable by the device further cause the device to determine the change in atmospheric pressure based on data corresponding to at least one of a magnitude or a phase of the RF return signal.

19. The computer program product of claim 18, wherein the program instructions executable by the device further cause the device to compare the pressure differential password with an authorization code.

20. The computer program product of claim 19, wherein the program instructions executable by the device further cause the device to send a signal upon a determination that the pressure differential password does not match the authorization code.

* * * * *